United States Patent [19]
Kwon et al.

[11] Patent Number: 5,812,869
[45] Date of Patent: Sep. 22, 1998

[54] CENTRALIZED DATA COMMUNICATIONS NETWORK METHOD USING FIRST- AND INTERMEDIATE-LEVEL SWITCH STATIONS AND DUAL PORT RAM

[75] Inventors: Soon Hong Kwon; Yoon Seok Oh; Heo Young Lee; Jeong Nam Yoon, all of Seoul, Rep. of Korea

[73] Assignee: Korea Telecommunication Authority, Seoul, Rep. of Korea

[21] Appl. No.: 650,811

[22] Filed: May 20, 1996

Related U.S. Application Data

[62] Division of Ser. No. 204,156, Aug. 25, 1994, Pat. No. 5,553,251.

[30] Foreign Application Priority Data

Jul. 2, 1992 [KR] Rep. of Korea .................. 1992-11717
Jul. 2, 1993 [KR] Rep. of Korea ........ PCT/KR93/00055

[51] Int. Cl.$^6$ .................................................. G06F 15/00
[52] U.S. Cl. .............. 395/800.28; 370/364; 364/242.94; 364/240; 364/DIG. 1
[58] Field of Search ....................... 340/825.02; 395/309, 395/200.2, 615, 800

[56] References Cited

U.S. PATENT DOCUMENTS

| | | | |
|---|---|---|---|
| 5,047,923 | 9/1991 | Elstner et al. | 395/615 |
| 5,204,949 | 4/1993 | Yasue et al. | 395/200.2 |
| 5,367,644 | 11/1994 | Yokoyama et al. | 395/309 |
| 5,455,568 | 10/1995 | Ichihashi et al. | 340/825.02 |

FOREIGN PATENT DOCUMENTS

| | | |
|---|---|---|
| 0 050 451 | 4/1982 | European Pat. Off. . |
| 0 441 707 | 8/1991 | European Pat. Off. . |
| 22 05 260 | 10/1980 | Germany . |
| WO84/03020 | 8/1984 | WIPO . |

*Primary Examiner*—Tod R. Swann
*Assistant Examiner*—David C. Langjahr
*Attorney, Agent, or Firm*—Merchant Gould Smith Edell Welter & Schmidt

[57] ABSTRACT

The Centralized Management System utilizing a Bus Interface Unit comprises a Computer (4z) installing an address Bus (4a), data Bus (4b), and control Bus (4c), a First-Level Station (4Q1) communicating with the Computer (4z) as the First-Level Station (4Q1) is connected to the buses (4a, 4b, 4c) of the Computer (4z), a plurality of second-level stations (4Q2, 4Q3, . . . , 4QM) communicating with the First-Level Station (4Q1) as the second-level stations (4Q2, 4Q3, . . . , 4QM) are connected to the First-Level Station through a Multipoint Bus (4r). Therefore, the Centralized Management System is capable of communicating the Computer with the First-Level Station through a Dual Port RAM (Random Access Memory), intercommunicating a plurality of Second-Level Stations through a Multipoint Interface and Multipoint Bus, and controlling and managing several thousands of Terminals (for example, Public Telephones). An operating method of the above system includes initializing the computer from a start signal, sending commands that instruct tasks to the first-level station through the dual port RAM, checking the response from the first-level station, performing programs related to the instructed tasks when there is a response from the first-level station, checking whether the instructed tasks are completed, and checking whether another task is instructed, and if so, sending commands to the first-level station, or terminating the process when no other task is instructed.

6 Claims, 7 Drawing Sheets

CENTRALIZED DATA COMMUNICATIONS NETWORK METHOD USING FIRST- AND INTERMEDIATE-LEVEL SWITCH STATIONS AND DUAL PORT RAM

This is a Division of application Ser. No. 08/204,156, filed Aug. 25, 1994 now U.S. Pat. No. 5,553,251.

BACKGROUND OF THE INVENTION

1. Field of the Invention

This invention relates to a Centralized Management System utilizing a Bus Interface Unit, more particularly to a Centralized Management System that is capable of communicating a Computer Terminal with a First-Level Station through a dual port RAM (Random Access Memory), intercommunicating a plurality of Second-Level Stations through a Multipoint Interface and Multipoint Bus, and controlling and managing several thousands of Terminals (for example, Public Telephones) at a given time.

2. Background of the Invention

In general, Terminals that are connected to a Public Communication Network are installed at a number of sites which are distributed in a wide area and remote users control and manage the Terminals using a Central Computer. Recently, as Terminals become more widely utilized, an economical and efficient Management System is required.

FIG. 1 through 3 illustrate a System that manages the conventional Terminals.

FIG. 1 is a block diagram illustrating a Terminal Management System according to the first embodiment of the conventional method. As shown in FIG. 1, a Serial Communication Device 1$u$ that is installed in a Computer 1$z$ is connected to a Modem 1$e$ and the Modem 1$e$ is connected to the Terminal Device 1$v$ by utilizing a Public Communication Network 1T.

Where a Computer 1$z$ communicates with Terminal Device 1$v$ through the Serial Communication Device 1$u$ that is installed in the Computer 1$z$, the number of Communication lines are limited to the number of Communication Devices that are installed in a Computer 1$z$, so that the number of Terminal Devices that can be connected at one time are limited. Moreover, a Computer 1$z$ should wholly perform the control of the Serial Communication Device and Modem and communicating Communication protocols.

However, in case remote users control and manage the Terminal Devices that are connected to the Public Communication Network and installed in multiple remote sites, the line capacity and performance of the Computer 1$z$ deteriorate.

FIG. 2 is a block diagram illustrating a Terminal Management System according to the second embodiment of the conventional method. As shown in FIG. 2, a Serial Communication Device 2$u$ is expanded by Bus Interfaces 2$a$, 2$b$, 2$c$ of a Computer 2$z$ and a Bus Interface 2$x$ of a Serial Communication Controller 2$d$, in order to expand the Serial Communication Line of the Serial Communication Device 1$u$ that is installed in the Computer 1$z$ shown in FIG. 1. In such case, the expanded Serial Communication Device 2$u$ comprises the Bus Interfaces 2$a$, 2$b$, 2$c$ of the Computer 2$z$, Bus Interface 2$x$ and Input/Output (I/O) Data and Control Signals 2$y$ of the Serial Communication Controller 2$d$.

Moreover, the Serial Communication Device 2$u$ is connected to a Modem 2$e$ and communicates with Terminal Device 2$v$ through a Public Communication Network 2T by the control of the Computer 2$z$. In this case, the Communication between the Serial Communication Device 2$u$ and Terminal Device 2$v$ follows the general Communication Protocols.

FIG. 3 is a block diagram illustrating M Serial Communication Devices 3$u$1, 3$u$2, . . . , 3$u$M which have been expanded using the method shown in FIG. 2 and a communication method of N Terminals 3$v$1, 3$v$2, . . . , 3$v$N performed through a Public Communication Network 3T. As shown in FIG. 3, each of M Serial Communication Devices 3$u$1, 3$u$2, . . . , 3uM control each corresponding Serial Communication Device of M Serial Communication Devices 3$u$1, 3$u$2, . . . , 3uM through Bus Interface Devices 3$x$1, 3$x$2, . . . , 3xM. Each of I/O Data and Control Signals 3$y$1, 3$y$2, . . . , 3yM of the Serial Communication Controller 3$d$1, 3$d$2, . . . , 3dM are connected to each of M Modems 3$e$1, 3$e$2, . . . , 3eM so that the Serial Communication Device 3$u$1, 3$u$2, . . . , 3uM communicate with N Terminal Devices 3$v$1, 3$v$2, . . . , 3vN through the Public Communication Network 3T. Moreover, the Communication between the Serial Communication Devices 3$u$1, 3$u$2, . . . , 3uM and Terminal Devices 3$v$1, 3$v$2, . . . , 3vN follows the general Communication protocols.

In this case, since the Computer 3$z$ wholly performs the tasks for controlling Communications between the Serial Communication Devices 3$u$1, 3$u$2, . . . , 3uM and Modems 3$e$1, 3$e$2, 3eM through M Communication Lines, the capacity and performance of the Computer 3$z$ deteriorate. Moreover, the number of Communication Lines that are installed in the system are limited, the Computer Programs for operating the Communication Lines are complicated, and remote users can not smoothly control and manage Terminal Devices 3$v$1, 3$v$2, . . . , 3vN through the Computer 3$z$ due to load related to the control of the Communication Lines. Therefore, it is very difficult to build a system controlling and managing several thousands of Terminals according to the method shown in FIG. 3

SUMMARY OF THE INVENTION

It is an object of the present invention to provide an economic and efficient system that can control and manage several thousands of Terminals in a given time.

It is another object of the present invention to provide a system controlling and managing several ten Terminals at the same time.

To achieve these purposes, the system of the present invention comprises a computer 4$z$ installing an address Bus 4$a$, data Bus 4$b$, and control Bus 4$c$, a First-Level Station 4Q1 communicating with the Computer 4$z$ as the First-Level Station 4Q1 is connected to the buses 4$a$, 4$b$, 4$c$ of the Computer 4$z$, a plurality of Second-Level Stations 4Q2, 4Q3, . . . , 4QM communicating with the First-Level Station 4Q1 as the Second-Level Stations 4Q2, 4Q3, . . . , 4QM are connected to the First-Level Station through a Multipoint Bus 4$r$. The Second-Level Stations are also connected to a plurality of Terminal Devices 4$v$1, 4$v$2, . . . , 4vN through a Public Communications Network 4T.

DETAILED DESCRIPTION OF A PREFERRED EMBODIMENT

The present invention will now be described in detail with reference to the accompanying drawings.

Figure 1:
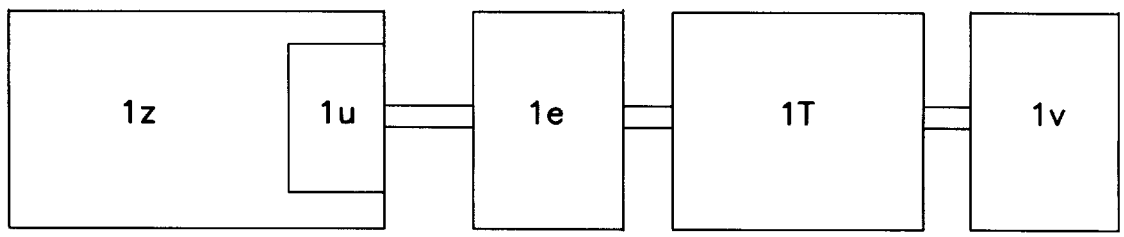
FIG. 1 is a block diagram illustrating a Terminal Management System according to the first embodiment of the conventional method.
Figure 2:
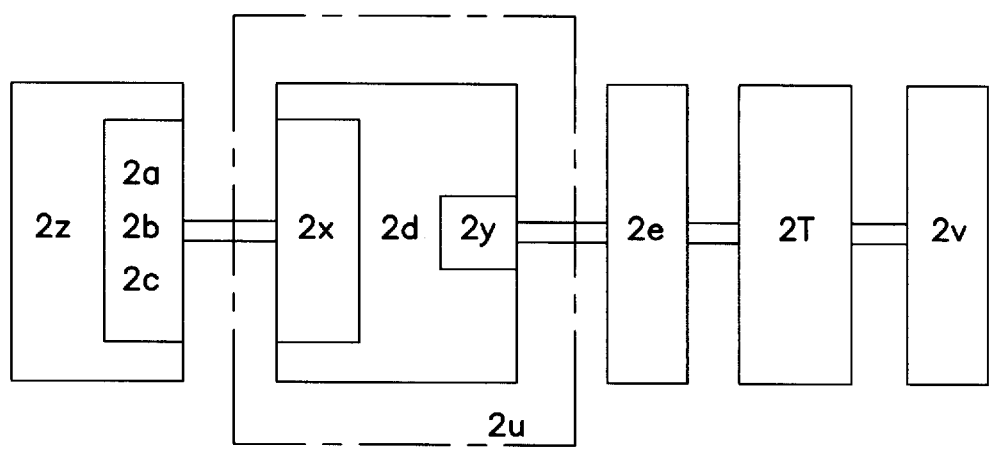
FIG. 2 is a block diagram illustrating a Terminal Management System according to the second embodiment of the conventional method.
Figure 3:
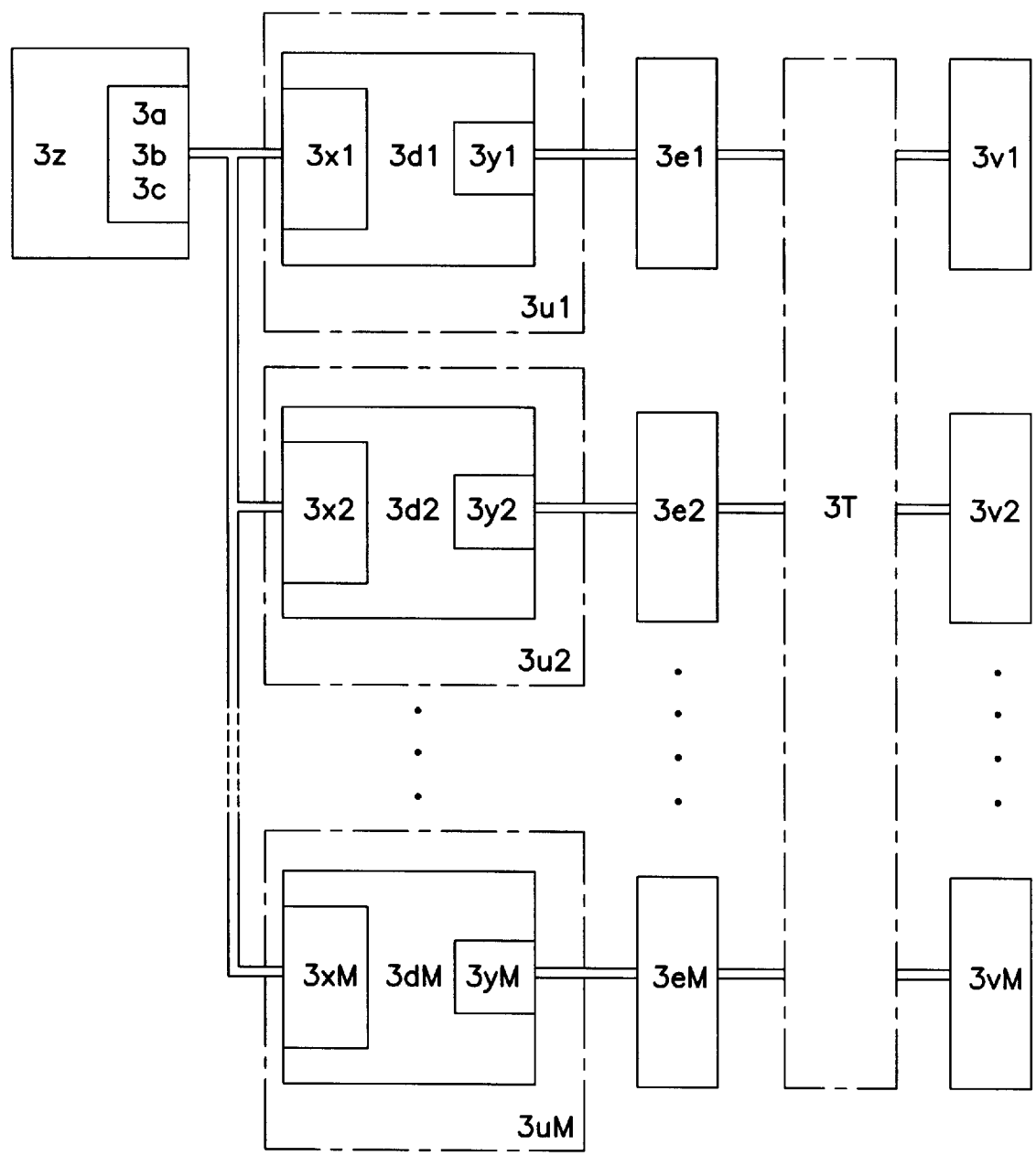
FIG. 3 is a block diagram illustrating M Serial Communication Devices 3$u$1, 3$u$2, . . . , 3uM which have been expanded using the method shown in FIG. 2 and a communication method of N Terminals 3v1, 3v2, . . . , 3vN performed through a Public Communication Network 3T.
Figure 4:
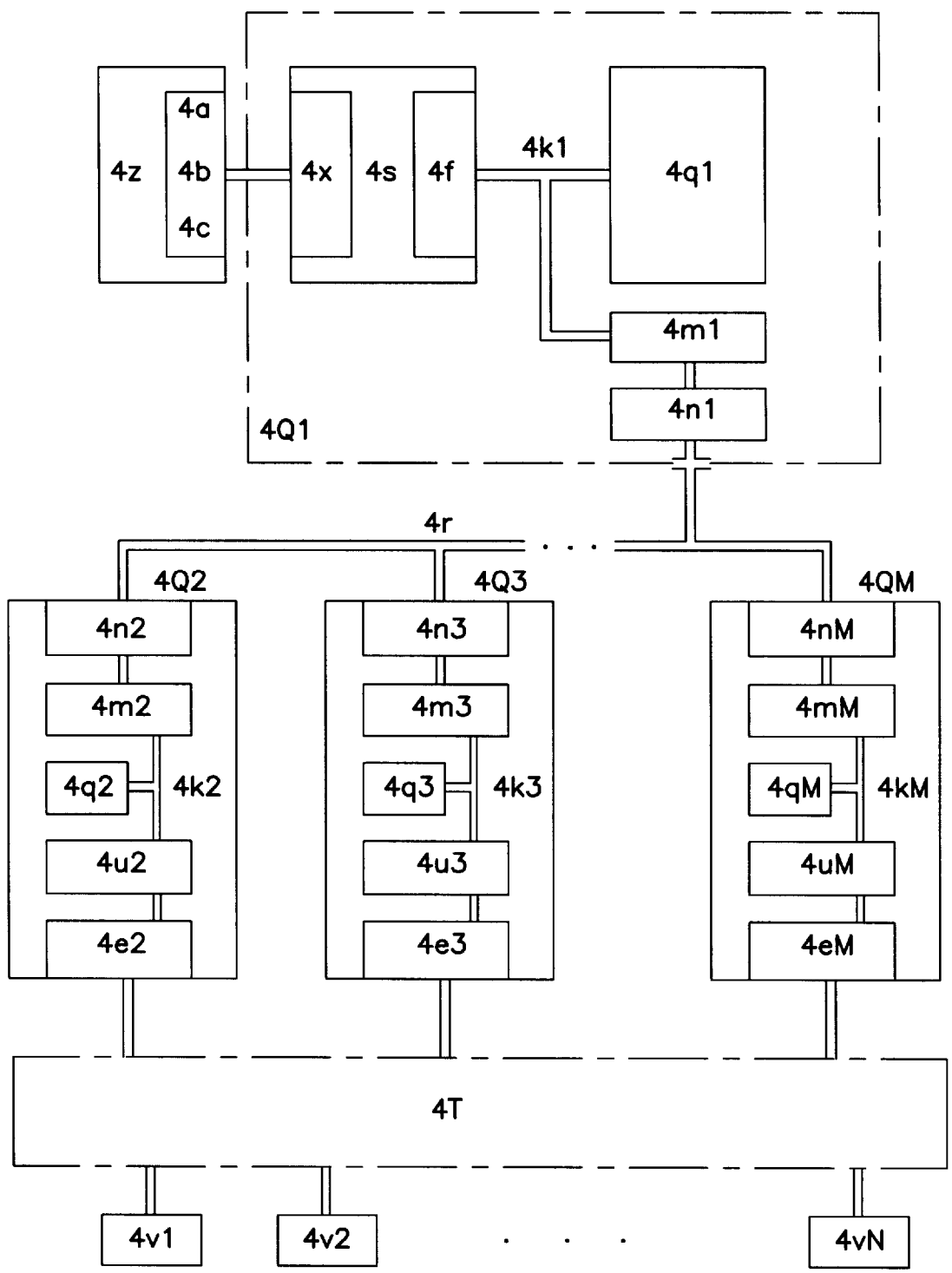
FIG. 4 is a block diagram illustrating a System that manages and controls a plurality of Terminals using a Bus Interface Unit according to the present invention.

FIG. 4 is a block diagram illustrating a System that manages and controls a plurality of Terminal Devices using a Bus Interface Unit according to the present invention.

As shown in FIG. 4, a Microcomputer System of the present invention comprises a Computer 4z which installs an address Bus 4a, Data Bus 4b, and Control Bus 4c, a First-Level Station 4Q1 which communicates with the Computer 4z as the First-Level Station 4Q1 is connected to the Buses 4a, 4b, 4c of the Computer 4z, a plurality of Second-Level Stations 4Q2, 4Q3, . . . , 4QM which communicate with the First-Level Station 4Q1 as the Second-Level Stations 4Q2, 4Q3, . . . , 4QM are connected to the First-Level Station through a Multipoint Bus 4r.

In such case, the First-Level Station 4Q1 of a High Level Data Link Control Procedure (HDLC) Communication method of the Unbalanced Regular Response level comprises a Dual Port RAM 4s installing a Bus Interface Device 4x connected to the Buses 4a, 4b, 4c of the Computer 4z, a Micio-Processor 4q1, a HDLC Communication Device 4m1, a Micro-controller Bus 4k1, and a Multipoint Interface 4n1. Moreover, components such as the Dual Port RAM 4s, Micro-Processor 4q1, and HDLC Communication Device 4m1 are linked to each other through a Micro-Controller Bus 4k1 and the HDLC Communication Device 4m1 is connected to a Multiple Interface 4n1.

In the above Microcomputer System, the Second-Level Stations 4Q2, 4Q3, . . . , 4QM of a HDLC Communication method of the Unbalanced Regular Response Level comprises a plurality of Multipoint Interfaces 4n2, 4n3, . . . , 4nM, a plurality of HDLC Communication Devices 4m2, 4m3, . . . , 4mM, a plurality of Micro-Processors 4q2, 4q3, . . . , 4qM, a plurality of Micro-Controller Buses 4k2, 4k3, . . . , 4kM, a plurality of Serial Communication Devices 4u2, 4u3, 4uM, and a plurality of Modems 4e2, 4e3, . . . , 4eM.

More detailed description of the communication construction mentioned above will be followed.

A Centralized Management System utilizing a Bus Interface Unit comprises a Computer 4z, a First-Level Station 4Q1, a plurality of Second-Level Stations 4Q2, 4Q3, . . . , 4QM, a Public Communication Network 4T, and a plurality of Terminal Devices 4v1, 4v2, . . . , 4vN.

A Computer 4z installs an Address Bus 4a, Data Bus 4b, and Controller Bus 4c. The Computer 4z is connected to a First-Level Station 4Q1 through these Buses. The First-Level Station 4Q1 comprises a Dual Port RAM 4s which installs two Bus Interfaces 4x, 4f, a Micro-Processor 4q1, a HDLC Communication Device 4m1, and a Multipoint Interface 4n1. The above Bus Interface 4x of the Dual Port RAM 4s is connected to the Buses 4a, 4b, 4c in the Computer 4z and the Dual Port RAM 4s is connected to the Micro-Processor 4q1 and HDLC Communication Device 4m1 through the Micro-Controller Bus (or Micro-Processor Bus) 4k1. As the Multipoint Interface 4n1 is connected to the HDLC Communication Device 4m1, a plurality of Second-Level Stations 4Q2, 4Q2, . . . , 4QM are connected to the First-Level Station 4Q1. Therefore, in accordance with the polling method, the First-Level Station 4Q1 is connected to a plurality of Multipoint Interfaces 4n2, 4n3, . . . , 4nM through a Multipoint Bus 4r that is connected to the Multipoint Interface 4n1 of the First-Level Station 4Q1.

Since the structure for constructing each of Second-Level Stations 4Q2, 4Q3, . . . , 4QM is identical to the others, the detailed description of a certain Second-Level Station 4QM will provide sufficient description for the structure of all Second-Level Stations 4Q2, 4Q3, . . . , 4QM.

In a Second-Level Station 4QM, a Multipoint Interface 4nM connected to one node of the Multipoint Bus 4r is connected to a HDLC Communication Device 4mM and the HDLC Communication Device 4mM is connected to a Micro-Processor 4qM and Serial Communication Device 4uM through a Bus Interface 4kM. Also, the Serial Communication Device 4uM is connected to a modem 4eM.

The constructions of the Second-Level Stations 4Q2, 4Q3, . . . , 4QM are identical to that of the Second-Level Station 4QM until reaching the construction method mentioned above. Thereafter, all Modems 4e2, 4e3. 4eM of the Second-Level Stations 4Q2, 4Q3, . . . , 4QM are connected to Multiple Terminals 4v1, 4v2, . . . ,4vN through a Public Network 4T.

Figure 5:
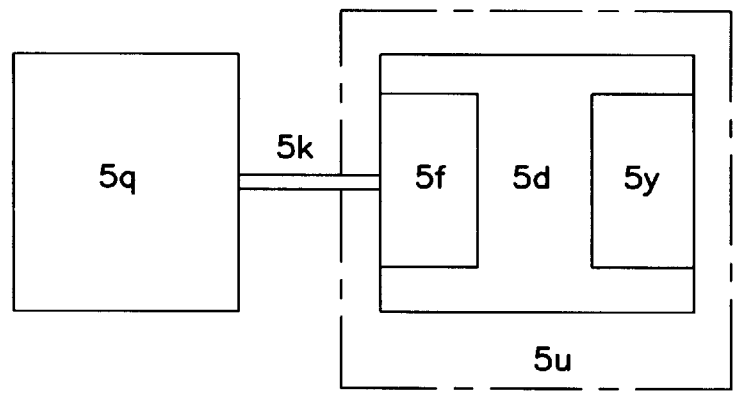
FIG. 5 shows a block diagram illustrating the structure of a Serial Communication Device of a plurality of Second-Level Stations 4Q2, 4Q3, . . . , 4QM according to the present invention.

FIG. 5 shows the structure of a Serial Communication Device of a plurality of Second-Level Stations 4Q2, 4Q3, . . . , 4QM according to the present invention. As shown in FIG. 5, the Serial Communication Device comprises a Micro-Processor 5q, a Bus 5k of the Micro-Processor 5q, and a Serial Communication Controller 5d. In such case, the Serial Communication Controller 5d comprises a Bus Interface 5f connected to the Bus 5k of the Micro-Processor 5q and a Serial I/O Data and Control Signals 5y.

Figure 6:
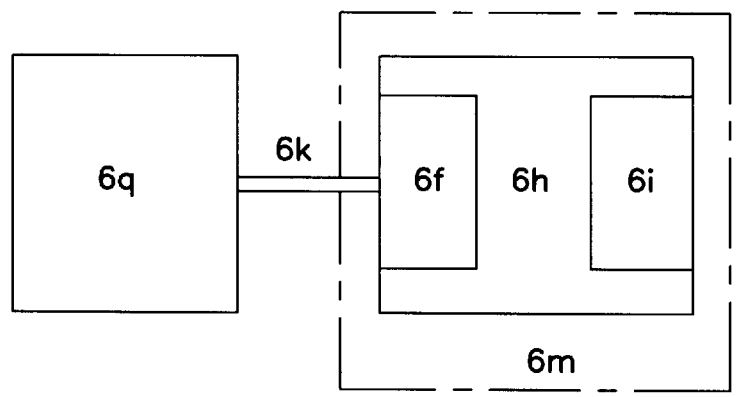
FIG. 6 shows the structure of a HDLC Communication Device of a plurality of Second-Level Stations 4Q2, 4Q3, 4QM according to the present invention.

FIG. 6 shows the structure of a HDLC Communication Device of the Second-Level Stations 4Q2, 4Q3, . . . , 4QM according to the present invention. As shown in FIG. 6, the HDLC Communication Device comprise a Micro-Processor 6q, a Bus 6k of the Micro-Processor 6q, a HDLC Communication Controller 6h, and a Serial I/O Data and Control Signals 6i, where the HDLC Communication Controller 6h comprises a Bus Interface 6f connected to the Bus 6k of the Micro-Processor 6q and a Serial I/O Data and Control Signals 6i.

The Communications between the First-Level Station 4Q1 and Computer 4z are processed through the Dual Port RAM 4s. The 'read' and 'write' functions of the Dual Port RAM 4s are activated as competition mode or noncompetition mode by the Semaphore Logic which is provided in the Dual Port RAM 4s and the operation between the Computer 4z and First-Level Station 4Q1 is mutually controlled using Interrupt Generation Logic that is provided in the Dual Port RAM 4s.

The Communication between the First-Level Station 4Q1 and Second-Level Stations 4Q2, 4Q3, . . . , 4QM are processed through the HDLC Communication Devices 4m2, 4m3, 4mM, Multipoint Interfaces 4n1, 4n2, . . . , 4nM, and Multipoint Bus 4r. In this case, the First-Level Station 4Q1 communicates sequentially with the Second-Level Stations 4Q2, 4Q3, . . . , 4QM by the polling method. However, the Second-Level Stations 4Q2, 4Q3 . . . , 4QM communicate with the First-Level Station 4Q1 through the Multipoint Bus 4r only when the First-Level Station 4Q1 tries to communicate with the Second-Level Stations 4Q2, 4Q3, . . . , 4QM.

A Computer 4z sends the control commands, data, and control data, which control the operation of the First-Level Station 4Q1 or Second-Level Station 4Q2, 4Q3, . . . , 4QM, to the First-Level Station 4Q1 through the Bus Interfaces 4a, 4b, 4c, 4x and Dual Port RAM 4s. The First-Level Station 4Q1 which receives the control commands, data, and control data from the Computer 4z controls itself or send them to the Second-Level Stations 4Q2, 4Q3, . . . , 4QM. The Second-Level Stations 4Q2, 4Q3, . . . , 4QM receiving the control commands, data, and control data from the First-Level Station 4Q1 control themselves or control arbitrary or specified Terminal Device according to the contents of the control commands and data.

In case many kinds of commands and data that are transmitted to certain Second-Level Station 4QM are transmitted to certain Terminal Device 4vN of N Terminal Devices 4v1, 4v2, . . . , 4vN and they are related to the control and management of the Terminal Device 4vN, a Micro-Processor 4qM of the Second-Level Station 4QM controls a Serial Communication Device 4uM and Modem 4eM according to the Communication Protocols so that the Second-Level Station 4QM controls and manages the Terminal Device 4vN through the Public Communication Network 4T. After the completion of the task, the Second-Level Station 4QM sends the results or information to the First-Level Station 4Q1 through Multipoint Bus 4r when the First-Level Station tries to reconnect. Thereafter, the First-Level Station 4Q1 writes the results or information, which have been collected from the Second-Level Station 4QM to the Dual Port RAM 4s, and notifies the existence of the instruction results or information to a Computer 4z using the Interrupt provided by the Dual Port RAM 4s. Since the Computer 4z reads the information in the Dual Port RAM 4s of the First-Level Station 4Q1 only when an interruption has been made, it can perform tasks without any loss of the Computer 4Z.

In case the control command, data, and control data transmitted to certain Second-Level Station 4QM wait for the connection from a certain Terminal Device 4vN of N Terminal Devices 4v1, 4v2, . . . , 4vN, the Micro-Processor 4qM of the Second-Level Station 4QM controls the Serial Communication Device 4uM and Modem 4eM in accordance with the Communication Protocols when the Micro-Processor 4qM of the Second-Level Station 4QM is connected by the Terminal Device 4vN. Therefore, the Micro-Processor 4qM of the Second-Level Station 4QM performs the tasks collecting the data and information through the Public Communication Network 4T. After the completion of the above tasks, the Second-Level Station 4QM waits for the connection from the First-Level Station 4Q1. When the First-Level Station 4Q1 tries to connect to the Second-Level Station 4QM, the Second-Level Station 4QM sends the collected information and data to the First-Level Station 4Q1 through the Multipoint Bus 4r. Thereafter, the First-Level Station 4Q1 writes the collected results or information to the Dual Port RAM 4s, and notifies the existence of the instruction results and information to the Computer 4z using the Interrupt provided by the Dual Port RAM 4s.

Figure 7:
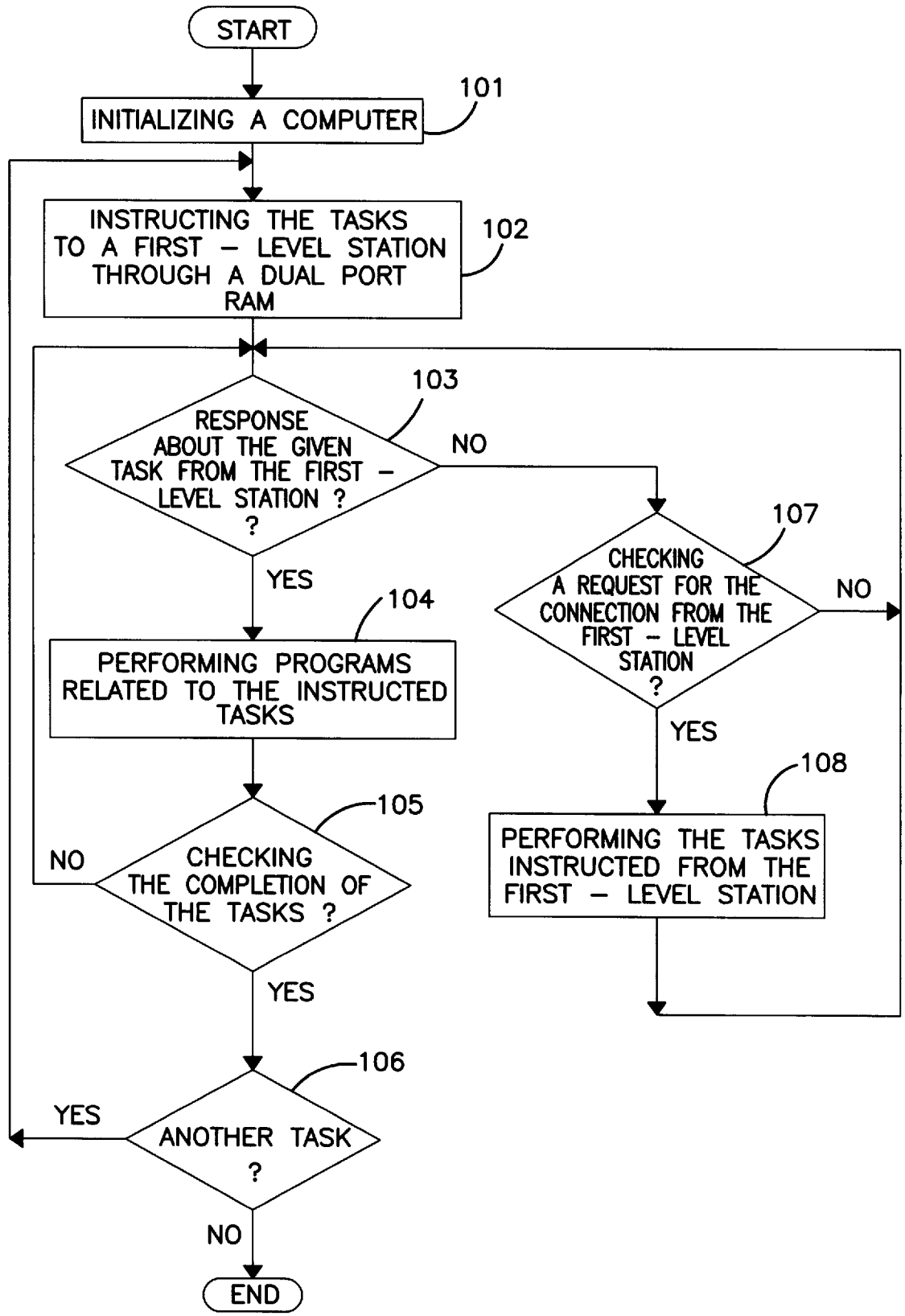
FIG. 7 shows a flowchart illustrating the operating processes between a Computer 4z and a First-Level Station 4Q1 according to the present invention.
Figure 8:
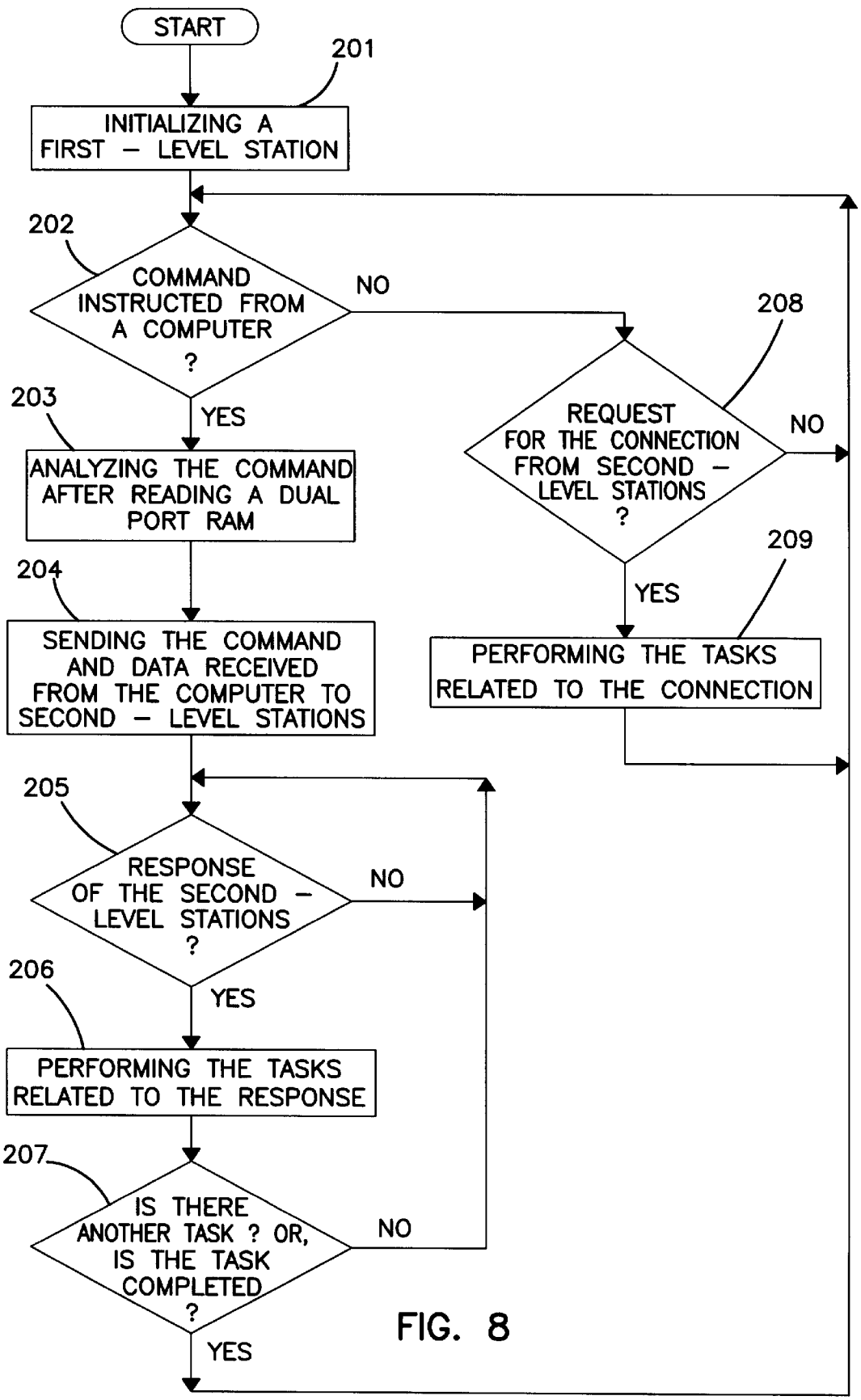
FIG. 8 shows a flowchart illustrating the operating processes between a First-Level Station 4Q1 and a plurality of Second-Level Station 4Q2, 4Q3, . . . , 4QM according to the present invention.
Figure 9:
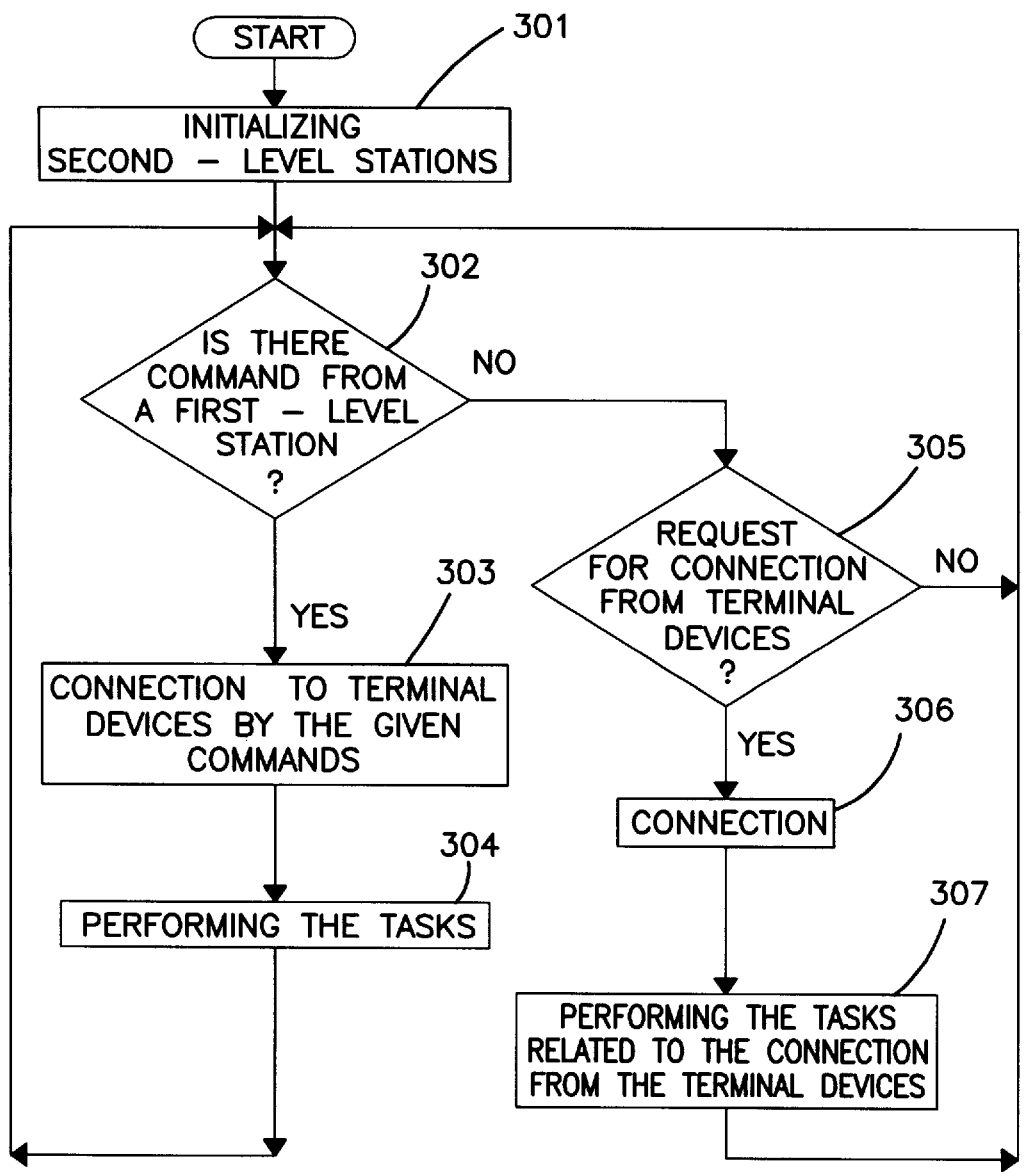
FIG. 9 shows a flowchart illustrating the operating processes between a plurality of Second-Level Stations 4Q2, 4Q3, . . . , 4QM and a plurality of Terminal Devices 4v1, 4v2, . . . , 4vN according to the present invention.

FIGS. 7 through 9 show flowcharts illustrating the operation processes according to the present invention.

FIG. 7 show a flowchart illustrating the operation processes between a Computer 4z and a First-Level Station 4Q1 according to the present invention. As shown in FIG. 7, the Computer 4z is initialized in Step 101 from the start signal and the operation proceeds to Step 102.

In Step 102, the command that instructs the tasks is sent to a First-Level Station 4Q1 through the Dual Port RAM 4s and the operation proceeds to Step 103.

In Step 103, the response from the First-Level Station 4Q1 is checked. If there is a response from the First-Level Station 4Q1, the operation proceeds to Step 104. If not, the operation goes to Step 107.

Step 107 checks whether there is a request for connection from the First-Level Station 4Q1 or whether any other data differing from the instructed tasks exist. If there are any other data deferring from the instructed tasks, the operation goes to Step 108. If not, the operation goes back to Step 103 and is continually proceeded.

In Step 104, after the performance of programs related to the instructed tasks, the operation proceeds to step 105. If the tasks have been completed, the operation proceeds to Step 106. If not, the operation goes back to Step 103.

Step 105 checks whether the tasks instructed to the First-Level Station 4Q1 have been completed. If the tasks instructed to the First-Level Station 4Q1 are completed, the operation proceeds to Step 106.

Step 106 checks whether another task have been instructed. If there is another task, the operation goes back to Step 102. If not, the whole operation terminates.

FIG. 8 shows a flowchart illustrating the operation processes between a First-Level Station 4Q1 and a plurality of Second-Level Station 4Q2, 4Q3, . . . , 4QM according to the present invention. As shown in FIG. 8, a First-Level Station 4Q1 is initialized in Step 201 from the start signal and then, the operation proceeds to Step 202.

Step 202 checks whether the commands from the Computer 4z have been instructed. If there has been an instruction command, the operation proceeds to Step 203. If not, the operation moves to Step 208.

Step 208 checks whether there have been a request for connection from the Second-Level Stations 402, 4Q3, . . . , 4QM. If there have been no request for connection, the operation goes back to Step 202. Otherwise, it moves to Step 209. In Step 209, after the tasks related to the connection are completed, the operation goes back to Step 202.

In Step 203, after the information is read in the Dual Port RAM 4s and the next command is analyzed, the operation proceeds to Step 204.

In Step 204, the First-Level Station 4Q1 is connected to the second-level stations 4Q2, 4Q3, . . . , 4QM and sends the commands and data, which have been received from a Computer 4z, to the selected one of the Second-Level Stations 4Q2, 4Q3, . . . , 4QM. Then, the operation proceeds to Step 205.

In Step 205, the response from the Second-Level Stations 4Q2, 4Q3, . . . , 4QM is checked. If there has been responses from the Second-Level Stations 4Q2, 4Q3, . . . , 4QM, the operation proceeds to Step 206. Otherwise, the operation moves back to Step 205.

In Step 206, the tasks related to the response is performed. After the completion of the task, the process moves to Step 207.

In Step 207, the completion of the tasks instructed from the First-Level Station 4Q1 is checked. Upon completion of such tasks, the process terminates. Otherwise, the operation proceeds to Step 205.

FIG. 9 shows a flowchart illustrating the operation processes between A plurality of Second-Level Stations 4Q2, 4Q3, . . . , 4QM and a plurality of Terminal Devices 4v1, 4v2, . . . , 4vN according to the present invention. As shown in FIG. 9, the Second-Level Station 4Q2, 4Q3, . . . , 4QM are initialized from the start signal in Step 301 and then, the operation moves to Step 302.

Step 302 checks whether there is any given command or task from the First-Level Station 4Q1. If such a command of task is found, the operation proceeds to Step 303. If not, the operation proceeds to Step 305.

In Step 303, the Second-Level Stations 4Q2, 4Q3, . . . , 4QM are connected to a plurality of Terminal Devices 4v11 4v2, . . . , 4vN through a Public Communication Network 4T according to the commands and then, the operation moves to Step 304.

In Step 304, after the tasks related to the commands is completed, the operation moves back to Step 302.

Step 305 checks whether there is a request for connection from the Terminal Devices 4v1, 4v2, . . . , 4vN. If there is no request for connection, the operation moves back to Step 302. Otherwise, it moves to Step 306.

In Step 306 and Step 307, after the tasks related to the connection from the Terminal Device 4v1, 4v2, . . . , 4vN are completed, the operation goes back to Step 302.

As described above, each Second-Level Stations 4Q2, 4Q3, . . . , 4QM can independently operate the given tasks. Therefore, a Computer 4z can control and manage the N terminals simultaneously without any loss in performance. And, each of Second-Level Stations 4Q2, 4Q3, . . . , 4QM can perform the given tasks independently and iteratively.

Although this invention has been described in its preferred form with a certain degree of particularity, it is appreciated by those skilled in the art that the present disclosure of the preferred form has been made only by way of example and that numerous changes in the details of the construction, combination, and arrangement of parts may be resorted to without departing from the spirit and scope of the invention.

What is claimed is:

1. An operating process between a Computer and a First-Level Station of a Centralized Management System using a Bus Interface Unit comprising the Steps of:
   (a) initializing a Computer from a start signal;
   (b) sending commands that instruct tasks to a First-Level Station through a Dual Port RAM;
   (c) checking a response from said First-Level Station;
   (d) executing programs related to the instructed tasks when there is a response from the First Level Station;
   (e) checking whether the tasks instructed to the First-Level Station are completed; and
   (f) checking whether another task is instructed, proceeding to Step (b) when there is another task, and terminating the whole process when there is no other task.

2. The operating process of claim 1, wherein Step (d) further comprises the Steps of:
   (1) checking whether there is a request for connection from said First-Level Station or whether any other data differing from the instructed tasks exist when there is no response from said First-Level Station; and
   (2) executing the tasks accompanying the connection when there is a request, and returning the operation to Step (c) when there is no request.

3. An operating process between a First-Level Station and a plurality of Second-Level Stations of a Centralized Management System using a Bus Interface Unit comprising the Steps of:
   (a) initializing a First-Level Station from a start signal;
   (b) checking whether commands from a Computer have been instructed;
   (c) reading the information in a Dual Port RAM when there is an instructed command, and analyzing the next command;
   (d) connecting said First-Level Station to said Second-Level Stations, sending the commands and data which have been received from said Computer to the selected one of said Second-Level Stations;
   (e) checking a response from said Second-Level Stations;
   (f) executing tasks related to the response when there is a response, and returning the operation to Step (e) when there is no response; and
   (g) checking the completion of the tasks instructed from said First-Level Station, terminating the whole process when the tasks instructed from said First-Level Station are completed, and returning the operation to Step (b) when the tasks instructed from said First-Level Station are not completed.

4. The operating process of claim 3, wherein Step (c) further comprises the Steps of:
   (1) checking whether there is a request for connection from the Second Level Stations when there is no instructed command, returning the operation to Step (b) when there is no connection request; and
   (2) executing the tasks related to the connection when there is the connection request, and proceeding to Step (b) after the tasks related to the connection are completed.

5. An operating process between a plurality of Second-Level Stations and a plurality of Terminal Devices of a Centralized Management System using a Bus Interface Unit comprising the Steps of:
   (a) initializing the plurality of Second-Level Stations from a start signal;
   (b) checking whether there is any given command or task from a First-Level Station;
   (c) connecting said Second-Level Stations to the plurality of Terminal Devices through a Public Communication Network when there is any given command or task from said First-Level Station; and
   (d) executing the tasks related to the commands from said First-Level Station, and returning the operation to Step (b) after the tasks related to the commands from said First-Level Station are completed.

6. The operating process of claim 5, wherein Step (c) further comprising the Steps of:
   (1) checking whether there is a request for connection from the Terminal Devices when there is no given command or task from said First-Level Station; and
   (2) executing the tasks related to the connection from said Terminal Device, returning the operation to Step (b) after the tasks related to the connection from said Terminal Device are completed.

* * * * *